United States Patent [19]

Drane

[11] Patent Number: 4,711,107
[45] Date of Patent: Dec. 8, 1987

[54] LAMP
[75] Inventor: John H. Drane, London, England
[73] Assignee: Duracell Inc., Bethel, Conn.
[21] Appl. No.: 826,166
[22] Filed: Feb. 4, 1986
[30] Foreign Application Priority Data
 Feb. 7, 1985 [GB] United Kingdom ............ 8503064
[51] Int. Cl.[4] ................ E05B 73/00; F21Y 29/00
[52] U.S. Cl. ................................ 70/233; 362/72; 362/267
[58] Field of Search .............. 70/233, 238, 241, 255; 362/72, 190, 191, 295, 368, 370, 371, 394, 430, 802, 267

[56] References Cited

U.S. PATENT DOCUMENTS

| | | | |
|---|---|---|---|
| 1,381,313 | 6/1921 | Kaufmann | 362/72 |
| 3,802,233 | 4/1974 | Riley | 70/241 |
| 4,028,913 | 6/1977 | Falk | 70/258 |
| 4,414,613 | 11/1983 | Mayer | 362/396 |
| 4,509,106 | 4/1985 | Mayer et al. | 362/427 |
| 4,586,113 | 4/1986 | Tsuyama | 362/72 |

FOREIGN PATENT DOCUMENTS

| | | |
|---|---|---|
| 267582 | 3/1927 | United Kingdom . |
| 418860 | 11/1934 | United Kingdom . |
| 450199 | 7/1936 | United Kingdom . |
| 455647 | 10/1936 | United Kingdom . |
| 499943 | 1/1939 | United Kingdom . |

*Primary Examiner*—James L. Ridgill, Jr.
*Attorney, Agent, or Firm*—Ronald S. Cornell; James B. McVeigh

[57] ABSTRACT

A cycle lamp or other accessory has a combined switch and locking mechanism. The lamp is mounted on an adjustable bracket by means of a blade projecting from the bracket and received in a socket of the lamp body. The blade has a notch which matches a notch in the socket. A locking quadrant engages these notches when operated by a key of a cylinder lock incorporated in the removable cover of the lamp body. In one position of the lock the cover is locked to the lamp body and the lamp is locked to the blade of the bracket and also impedes access to the clamping screws of the bracket. The key also operates the on/off switch of the lamp, while in the locked condition. In the unlocked position, the lamp is switched off, but when removed from the bracket the lamp can be turned on and off by means of the key. The blade is mounted on a swivel which can rotate on one saddle of the clamping bracket, mating teeth being provided for positively locating the swivel in a selected angular position, the swivel and bracket together permit substantially universal adjustment of the lamp.

13 Claims, 10 Drawing Figures

LAMP

This invention relates to accessories for bicycles, tricycles, motorcycles and the like.

A very common problem is the theft of lamps and other accessories from bicycles. Various solutions to this have been proposed, including lamps of which the main parts are detachable easily by the rider when the cycle is parked. However existing lamp designs of this kind are rather inconvenient and clumsy.

Another common problem is that of mounting lamps and other accessories e.g. horns, direction indicators, on cycles. According to the design of the cycle and the desires of the user, cycle accessories can be mounted in a wide variety of positions. Existing mountings and lamp brackets are of limited versatility and are not always easy to use. They also tend to damage the paintwork of the cycle frame.

A first object of the present invention is to provide an improved lamp which on the one hand allows easy removal from a cycle and on the other hand provides security while remaining attached to the cycle.

Another object of the present invention is to provide an accessory mounting bracket which is versatile and convenient.

According to a first aspect of the present invention, a cycle accessory and a mounting bracket are provided with respective complementary mating portions for mounting the accessory on the bracket, and a preferably integral locking mechanism is provided for locking the accessory as a whole to the bracket, whereby the accessory as a whole can be removed from the bracket when desired.

The locking means preferably comprise a key to operate a lock incorporated in the accessory or in the bracket.

According to another aspect of the present invention, a cycle lamp or other accessory has a control switch comprising a key switch with a removable key which also operates a locking mechanism which, when locked, securely fastens the accessory to the cycle and the accessory body components to one another, the key being removable in the locked condition. Thus, the user can remove the key, leaving the accessory in a condition in which it cannot be removed from the cycle, or opened, without physical violence; also the accessory cannot be switched. This accessory is intended to be used with a mounting means, in particular a mounting bracket, of which any releasable clamping or adjusting elements are arranged to be inaccessible when the accessory is in position. The key switch can be used to release the accessory completely from its bracket so that it can be removed for complete security, or to enable the bracket to be adjusted or removed.

According to yet another aspect of the invention, a mounting bracket for a cycle accessory e.g. a lamp comprises a pair of clamping elements, for clamping about a cycle frame tube or the like, a swivel member mounted adjustably on one of these, and means for releasably attaching the swivel member to an accessory. Preferably the said attaching means comprise a projection adapted to mate with the accessory and to cooperate with a locking mechanism for fixing the accessory to the bracket. Preferably the locking mechanism is generally as set forth above.

Preferably, the projection is a flat or substantially flat blade or a post mounted on one clamping member of the bracket, so that it can swivel about an axis substantially parallel to the blade itself but preferably eccentric. Normally this axis will be substantially perpendicular to the cycle frame member on which the bracket is clamped.

Preferably the blade fits into a matching slot in the accessory body, preferably in the underside of the latter, and has a notch or other configuration to cooperate with a locking member in the body.

Preferably, screws or other means provided for clamping the bracket on the cycle frame, and for setting the mounting projection in a desired position, are so placed that they are inaccessible when the accessory is fitted on the bracket. Thus, if the accessory is locked in place on the bracket, neither the accessory nor the bracket can be removed without physical violence.

With a bracket of the kind set forth, the accessory can easily be set in a wide variety of positions and orientations relative to the cycle frame member on which the bracket is mounted, therefore the bracket and accessory can conveniently be mounted on practically any part of the cycle frame or on an accessory such as a load carrier.

Exemplary embodiments of the invention will be described with reference to the accompanying drawings, in which.

Figure 1:
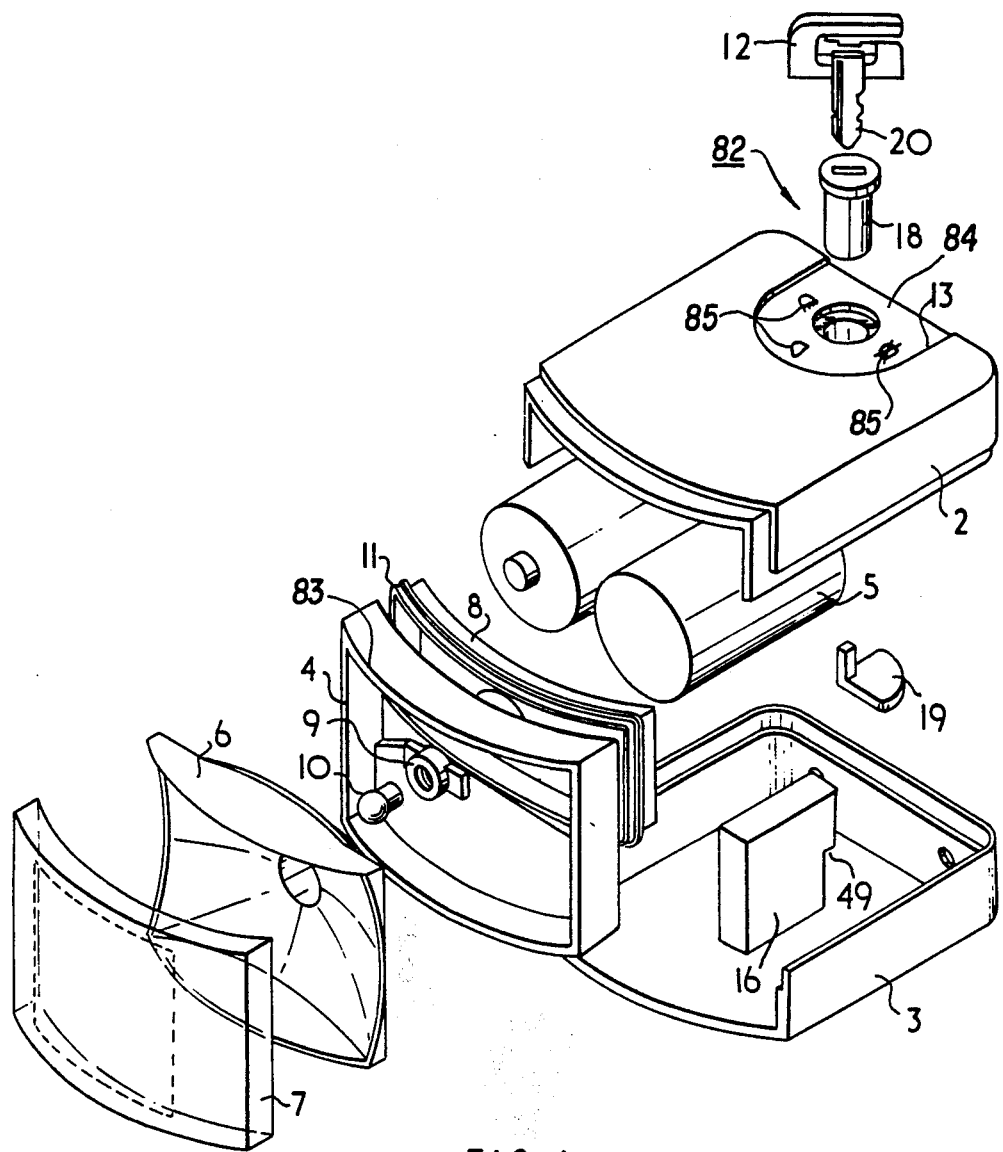
FIG. 1 is an exploded view of a first embodiment of a cycle front or rear lamp in accordance with the invention.

The lamp illustrated in FIG. 1 has a body 1 of moulded plastics material, consisting of three principal parts, namely an upper shell 2, a lower shell 3 and a forward head frame 4. The upper and lower shells together form a substantially rectangular box which accommodates dry cells 5 together with contact springs 80 and connectors 81 (see FIGS. 2, 7) and a switching and locking mechanism 82 to be described below.

The frame 4 is somewhat deeper than the box formed by the body shells and accommodates a reflector 6 and a lens plate 7.

Between the frame 4 and the shells 2, 3, is a spacer 8 in which are seated suitable contact springs 80 and connectors 81 for the dry cells. In the centre of the spacer 8 is an opening through which electrical connection is made with a bulb holder 9 and bulb 10.

The upper and lower body shells have matching rebates along their edges so that the rim of the upper shell fits inside the rim of the lower shell. The box thus formed mates with the open side of the spacer 8 which in turn fits in the head frame 4. The lower shell, frame, reflector, lens plate and spacer are permanently assembled together, whereas the top shell remains a separate removable part forming a cover.

For enhanced visual appeal, the spacer 8 has a flange 11 which is exposed between the body box and the head frame 4 and is of a contrasting colour. For example, the body box and head frame may be matt black or charcoal in colour whereas the spacer may be of yellow, orange or gold coloured plastics material.

The frame 4 extends below the lower shell 3 and incorporates a rear closure plate 39 (FIG. 2) in its lower region, so that the lamp body is fully closed when assembled.

The lens plate is convex and correspondingly the upper part of the frame 4 has a curved rim 83 echoing the shape of the lens. The rear closure plate 39 of the frame 4 extends obliquely to the rear and is convex, the lower part of the spacer 8 being shaped concave correspondingly. The exposed side flanges 11 of the spacer 8 are vertical and extend from top to bottom of the body box in a straight line (see FIG. 4).

The lamp is turned on and off by switch mechanism 82 at the rear of the body box, operated by an arm 12 which is located within a semi-circular recess 13 in the upper surface of the upper shell, towards the rear of the latter. The switching mechanism itself can be of any convenient kind.

In the floor of the lower shell, at a position between the dry cells 5, is a longitudinal rectangular opening 14. This receives a rectangular blade or lug 15 of a mounting bracket separate from the lamp.

The lower shell has an upstanding rectangular socket 16 for receiving the blade 15, however the blade 15 may alternatively be freely exposed inside the lamp body.

Immediately adjacent to the rear side of the socket and of the blade, the upper shell has an integral cylinder lock with a rotatable lock cylinder 18, the cylinder axis being parallel to the rear upstanding edge of the blade 15. At the lower end of the lock cylinder 18 is a locking tongue in the shape of a quadrant. A key blade 20 integral with the switch arm 12 extends into the lock cylinder 18, such that the cylinder 18 and therefore the locking tongue 19 can rotate only when the key blade is inserted.

The lock cylinder is held in place in the upper body shell e.g. by an indicator plate 84 which carries the position markings 85 for the switch and is fastened permanently in the switch recess 13 over the lock cylinder. The indicator plate is fixed in position for example by sonic welding. The various components of the lamp can be fastened together by sonic welding, solvent welding, adhesives or in any other convenient way.

The switch and locking mechanism 82 has three positions.

In a first position, the tongue 19 is clear of the blade 15. This position of the locking tongue is illustrated in FIG. 1. In this position, the lamp can be lifted off the blade 15 and the top shell 2 can be removed from the lower shell 3.

In this first position, the lock does not hold the upper and lower shells together, but a latch or clip (not shown) does. The lamp can therefore be used when detached from the cycle, as a torch. To release the top shell, for example to change the bulb or batteries, the clip or latch is released. The clip or latch snaps into position when the upper shell is replaced on the lower shell and is positively held in position by the lock or by the tongue 19 when the lock is in the second or the third position.

By rotation of the switch arm 12 and key through 90°, the tongue 19 is brought into engagement with a notch 21, in the upright rear side of the blade 15. The tongue 19 is positively retained in the top body shell, therefore in this position the top and body shells are positively locked to the bracket of which the blade 15 forms part. If the lower body shell is provided with a socket 16, this socket may also be provided with a locking notch 49 at its rear side as shown in FIG. 1, to be engaged by the locking tongue for additional security. In this position of the arm 12, the lamp switch is off, and the arm and key blade can be withdrawn from the cylinder 18, leaving the lamp locked on the bracket. In this condition, the lamp cannot be removed or opened, without physical violence, and cannot be switched on, if a key matching the lock mechanism is not available. This provides excellent security against theft of the lamp or of its contents.

When the switch arm 12 and therefore the quadrant tongue 19 are rotated through a further 90°, the tongue closes switch contacts 68, 69 (see FIG. 7) of the lamp which are built into the lower body shell. In this condition, the tongue remains in engagement with the notches provided in the blade 15 and socket 16. In this condition, the switch arm and key blade may be removable from the lock cylinder but are preferably retained.

In the unlocked first position, the switch arm and key blade are preferably retained in the lock cylinder, so as not to be accidentally separated from the lamp.

It will be understood that the switch arm 12 can be operated to turn the lamp on and off, when the lamp is separate from the lamp bracket.

The switch arm recess 13 is provided with markings to indicate the respective positions of the switch arm 12 namely "unlocked", "locked, lamp off", "locked, lamp on".

For convenience of manufacture, the locking tongue quadrant 19 is made as a separate component from the lock cylinder 18 as shown in FIG. 1 and these components are secured to one another when the lamp is assembled.

FIGS. 2 to 8 illustrate details of a preferred embodiment of the invention. Components corresponding to those shown in FIG. 1 are identified by corresponding reference numerals.

Figure 2:
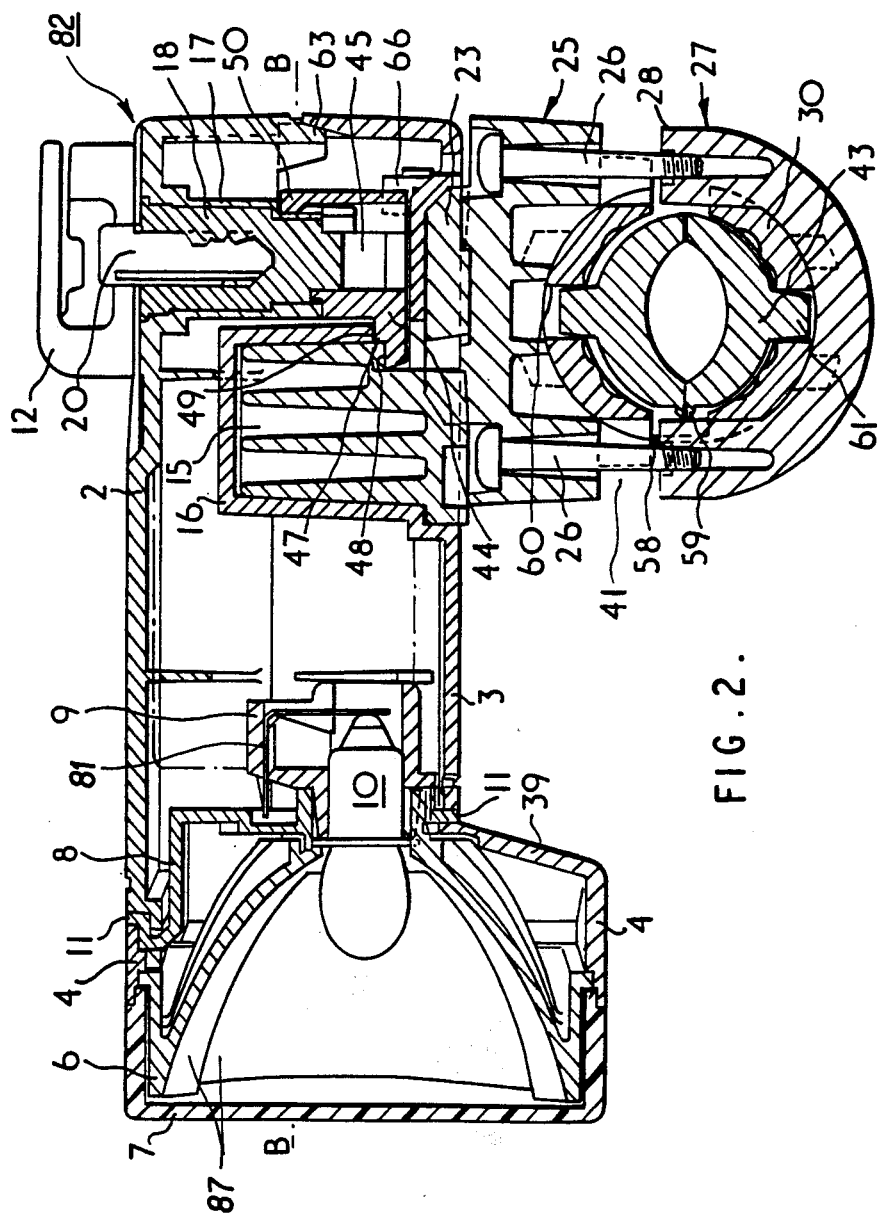
FIG. 2 is a vertical cross section of a cycle front lamp embodying the invention, mounted on a bracket embodying the invention.

The lamp illustrated in FIG. 2 has a body 1 of moulded ABS material, consisting of the upper shell 2, lower shell 3 and head frame 4. The upper and lower shells together form a substantially rectangular box which accommodates dry cells 5 together with contact springs 80 and connectors 81 and the switching and locking mechanism 82

The frame 4 is somewhat deeper than the box formed by the body shells 2, 3, and accommodates the reflector 6 made of metallized polystyrene and a lens plate 7 made of OROGLAS (Trade Mark) or other acrylic. The lamp of FIG. 2 is a front lamp and therefore has a substantially plain clear lens.

Between the frame 4 and the shells 2, 3, is the spacer 8 made of ABS, acetal or other plastic in which are seated suitable contact springs 80 and connectors 81 for the dry cells. In the centre of the spacer 8 is an opening in which is seated a removable bulb holder 9 and prefocus bulb 10.

The upper and lower body shells have matching rebates along their edges so that the rim of the lower shell fits inside the rim of the upper shell except for a tongue 63 at the rear which fits inside the rear rim of the lower shell, to prevent the upper shell from sliding backwards relative to the lower shell. The box thus formed mates with the open side of the spacer 8 which in turn fits in the head frame 4. The lower shell 3, frame 4, reflector 6, lens plate 7 and spacer 8 are permanently assembled together, whereas the top shell 2 remains a separate removable part forming a cover.

For enhanced visual appeal, the spacer 8 has a flange 11 which is exposed between the body box and the head frame 4 and is of a contrasting colour. For example, the body box and head frame may be matt black or charcoal in colour whereas the spacer may be of yellow, orange or gold coloured plastics material. Preferably the body box and head frame have a spark-eroded matt finish.

The frame 4 extends below the lower shell 3 and incorporates a rear closure plate 39 (FIG. 2) in its lower region, so that the lamp body is fully closed when assembled.

The lens plate is convex and correspondingly the upper part of the frame 4 has a curved rim echoing the shape of the lens. The rear closure plate 39 of the frame 4 extends obliquely to the rear and is convex, the lower part of the spacer 8 being shaped concave correspondingly. The exposed side flanges 11 of the spacer 8 are vertical and extend from top to bottom of the body box in a straight line (see FIG. 4).

The lamp is turned on and off by a switch mechanism 32 at the rear of the body box, operated by arm 12 which is located within shallow semi-circular recess 13 in the upper surface of the upper shell, towards the rear of the latter. The switching mechanism itself can be of any convenient kind.

In the floor of the lower shell, at a position between the dry cells 5, is a longitudinal rectangular opening 14. This receives the rectangular blade 15 of the mounting bracket separate from the lamp.

The lower shell has an upstanding generally rectangular socket 16 for receiving the blade 15.

Immediately adjacent to the rear side of the socket and of the blade 15, the upper shell has a cylindrical integral sleeve 17 in which is a rotatable lock cylinder 18, the cylinder axis being parallel to the rear upstanding edge of the blade 15. At the lower end of the lock cylinder 18 is a cam plate 44 generally in the shape of a quadrant. Key blade 20 integral with the switch arm 12 extends into the lock cylinder 18, and the sleeve 17 and cylinder 18 comprise a cylinder locking mechanism such that the cylinder 18 and therefore the cam plate 44 can rotate only when the key blade is inserted.

The various components of the lamp can be fastened together by sonic welding, solvent welding, adhesives or in any other convenient way.

The cam plate 44 has an aperture 45, in the upper end of which the lower end of the lock cylinder 18 is fastened by a push-in snap-fit retaining configuration so that the lock cylinder 18 and cam plate 44 are firmly united. The upper end of the cam plate adjacent this aperture is shaped to provide a shoulder which engages the lower end of the lock sleeve 17, so as to retain the cam plate and therefore the lock cylinder in position in the upper body shell 2. At a lower level, the cam plate has a locking quadrant 46 of stepped profile, defining a first locking shoulder 47 for engaging notch 49 provided in the rear side of the socket 16, and a lower second shoulder 48 for engaging the notch 21 of the blade 15. On its side opposite the quadrant 46 the cam plate has an upstanding finger 50 which overlaps the external surface of the lock sleeve 17 and is provided with a detent nib 51 at its upper end, which presses against the sleeve 17 by virtue of the resilience of the material of the cam plate, made for example of moulded acetal. The sleeve 17 has three angularly spaced external notches 52 selectively engageable by the nib 51 to locate the cam plate in any one of three possible positions (see FIG. 7). Adjacent to the finger 50 is a horizontally extending tongue 53 spaced from one end of the quadrant 46.

Integral with the base of the lower body shell 3 is a hook or claw 86 comprising an upstanding post 64 integral with the base of the lower body shell, and a horizontal limb 65 which projects laterally from the upper end of this post and is spaced above the internal surface of the lower body shell. This limb 65 overhangs the lower shoulder 48 of the cam plate, and therefore positively retains the cam plate, and with it the lock and upper body shell, in the lower body shell.

The switch and locking mechanism 82 has four positions.

Figure 7:
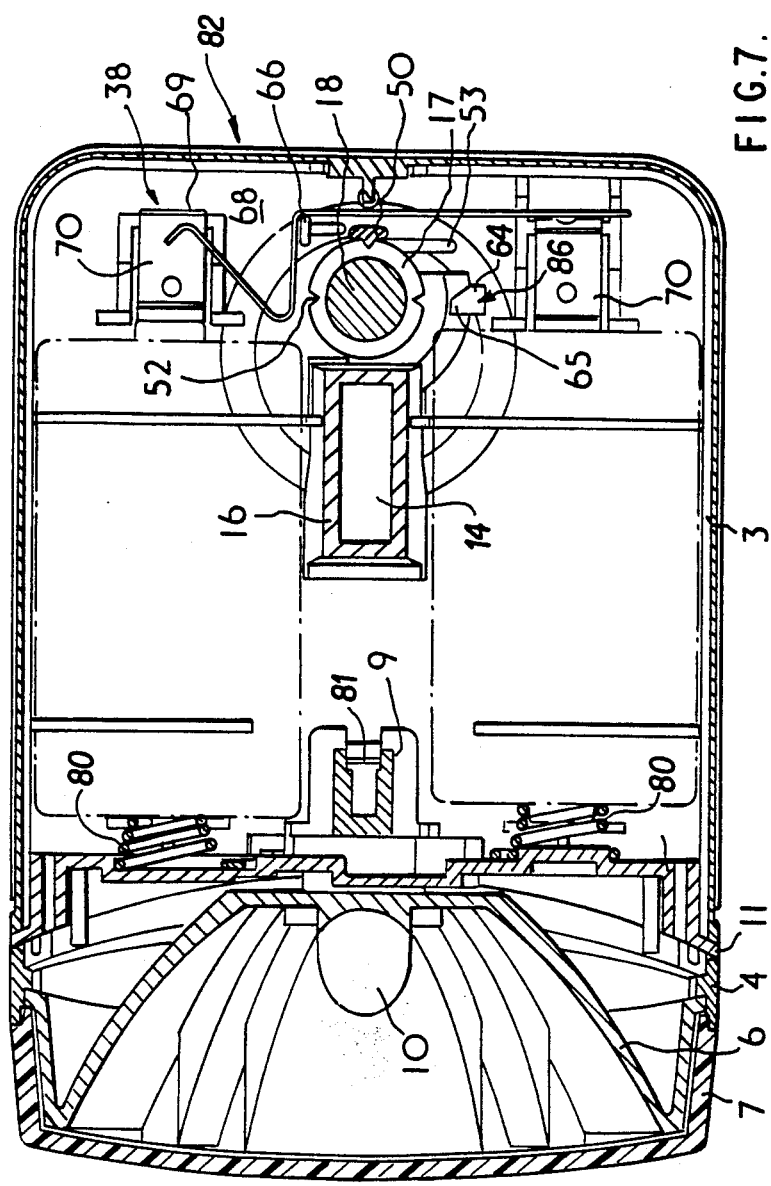
FIG. 7 is a cross section of the cycle front lamp, seen from above.

In a first position (which is displaced 90° anticlockwise from the position shown in FIG. 7), the quadrant 46 is clear of the blade 15 and socket 16. In this position, the lamp can be lifted off the blade 15.

In this first position, the lock holds the upper and lower shells together, because the quadrant 46 is still engaged under the limb 65 of the retaining post 64. To release the upper body shell from the rest of the lamp, the key must be turned anticlockwise through about a further 15°, in order to rotate the quadrant 46 clear of the limb 65.

In the described first position, the tongue 53 of the cam plate is adjacent to a post 66 integral with the bottom of the lower body shell. When the lock is turned through the further 15° to release the quadrant 46 from the retaining post 64, the tongue 53 presses against the post 66 and is deflected by it, the resilience of the tongue 53 thereby providing a restoring spring action so that when the user releases the key, the lock automatically returns to the first position.

When the upper body shell is replaced on the rest of the lamp, the user must turn the lock through the above-described further 15° to enable the quadrant 46 to be inserted past the limb 65, after which rotation of the cam plate (by the user or by the restoring spring action of the tongue 53) engages the quadrant 46 under the retaining limb 65. Alternatively, and preferably, the limb 65 and/or the radial end surface of the quadrant 46, at the clockwise end of the quadrant, may have oblique cam surfaces, so shaped and placed that when the upper body shell is fitted onto the lower body shell with the lock in the first position, the camming action between the limb 65 and the edge of the quadrant 46 caused the quadrant 46 to rotate anticlockwise and thereby slide past the limb 65 and then engage under it with a snap action due to the spring restoring action of the tongue 53.

By rotation of the switch arm 12 and key through 90° clockwise from the first position to a third position (shown in FIG. 7) the quadrant 46 is brought into engagement with the notch 21 in the upright rear side of the blade 15 and the notch 49 in the upright rear side of socket 16, as shown in FIG. 2. The cam plate 44 is positively retained in the top body shell as described above, therefore in this position the top and body shells are positively locked to the bracket of which the blade 15 forms part. In this position of the arm 12, the lamp switch 38 is off, and the arm and key blade can be withdrawn from the cylinder 18, leaving the lamp locked on the bracket. In this condition, the lamp cannot be removed from the bracket or opened, without physical violence, and cannot be switched on, if a key matching the lock mechanism is not available. This provides excellent security against theft of the lamp or of its contents.

When the switch arm 12 and therefore the quadrant 46 are rotated through a further 90° clockwise to a fourth position, the radial leading edge of the quadrant 46 engages a contact spring blade 68 which forms the movable contact of the switch 38, so as to press the free end of the contact blade 68 against a fixed contact 69 of the switch 38, thereby closing the switch and turning the lamp on. These switch contacts are mounted in the lower body shell and are conected to the dry cells through suitable fixed contact tabs or posts 70.

It will be seen from FIG. 7 that when the switch 38 is open, the movable contact blade 68 rests against and is located by the previously mentioned post 66. It will be understood that, if the limb 65 or quadrant 46 is provided with a cam surface as described above, the post 66 must have a height sufficient to be engaged by the tongue 53 as soon as the edge of the quadrant 46 comes into contact with the limb 65 when the upper body shell is replaced on the lower body shell. In this position the quadrant 46 remains in engagement with the notches 21, 49 provided in the blade 15 and socket 16. In this position, the switch arm and key blade are retained in the lock cylinder.

In the unlocked first position, the switch arm and its key blade are retained in the lock cylinder, so as not to be accidentally separated from the lamp.

It will be understood that the switch arm 12 can be operated to turn the lamp on and off, when the lamp is detached from the lamp bracket.

The switch arm recess 13 is provided with markings 85 to indicate the respective positions of the switch arm 12.

For convenience of manufacture, the locking cam plate 44 is made as a separate component from the lock cylinder 18 as shown in FIG. 2 and these components are secured to one another by a snap lock when the lamp is assembled.

FIGS. 2 and 7 show a cycle front lamp, with a clear lens and a highly directional reflector. The reflector can be of any convenient design, preferably however it comprises nested multiple reflector surfaces 87 of different radius, in a stepped arrangement such as to appear continuous with reference to the light emitted from the bulb. Such a compound reflector, by appropriate selection of the radii and focal centres of the different reflector segments, can produce a highly directional beam from a relatively small reflector, though focussing lens elements may also be provided, and in particular can provide an excellent beam distribution from a horizontal rectangular lamp aperture such as that illustrated.

The same basic lamp configuration can be used also for a rear lamp, the directional reflector 6 and clear lens 7 being replaced by a simpler and less strongly directional reflector 6a, and a lens 7a incorporating a reflector configuration and diffusing elements for the light, made for example of red-coloured acrylic material such as Oroglas (trade mark).

Figure 3:
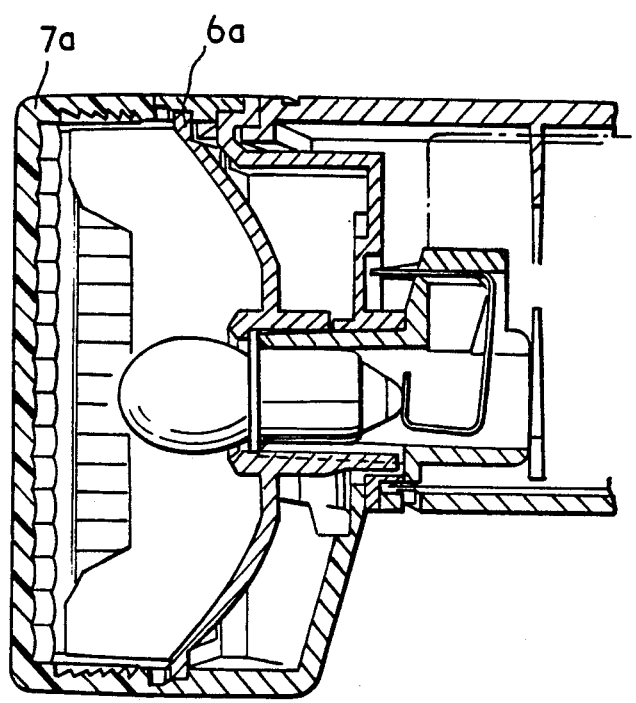
FIG. 3 is a partial cross section of a cycle rear lamp embodying the invention.

The head end of such a rear lamp is shown in FIG. 3. It will be seen that in this case, the reflector 6a is relatively shallow and is cut away at the sides and at the top and bottom, to allow the red light to be seen clearly from the sides of the lamp, for safety.

The lamp support bracket is designed to provide maximum versatility and security of mounting.

The blade 15 is integral with an arm 22 which extends radially with respect to a disc 23 with a ring of serrations 40 on its underside. The disc 23 is attached e.g. by a central screw (not shown) to the generally flat upper surface of an upper clamp saddle 25 of generally rectangular profile. The flat upper surface of the saddle 25 has a serrated ring 24 facing the serrated undersurface of the disc 23 so that the latter can be positively locked or positioned at any desired orientation relative to the saddle 25, by loosening the screw attachment between the disc 23 and saddle 25, rotating the disc 23, and retightening the screw. This can be done while the lamp is separated from the bracket. As can be seen from FIG. 2, when the lamp is locked onto the bracket, the screw attachment between disc 23 and saddle 25 is completely covered and inaccessible.

The saddle 25 is attached by a pair of clamping screws 26 to a lower clamp saddle 27 of semi-circular profile with integral posts 28 which are aligned with sockets 41 in the upper saddle 25 to provide accurate location of the saddles. The screws 26 extend through the upper saddle into these posts and thence into screw threads of the lower saddle e.g. of nuts embedded or otherwise fitted in the lower saddle 27.

Figure 9:
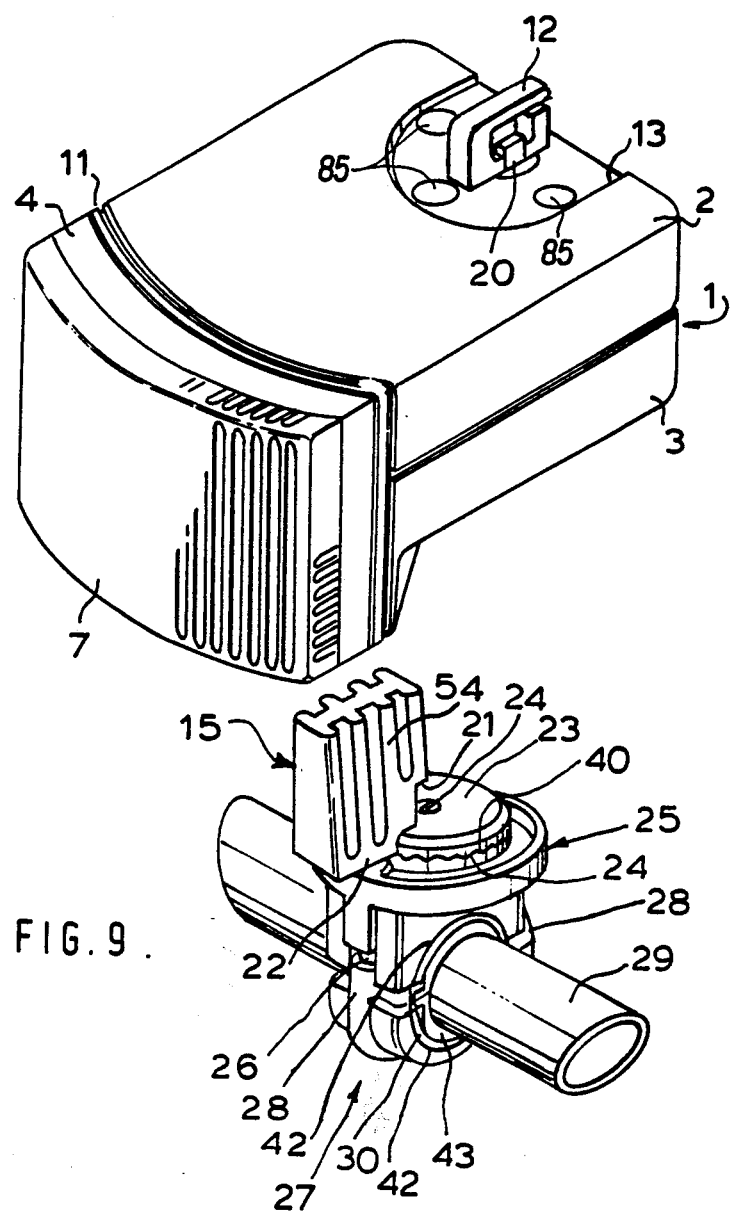
FIG. 9 shows the lamp clamped onto a cycle frame.

The clamp saddles have matching flats 88 at their sides and each has a semi-circular seat 42, thereby forming a substantially circular clamping opening to be fitted on a cycle frame member 29 as shown in FIG. 9. The bracket is clamped onto the frame member by means of the screws 26. Like the screw fastening for the swivel disc 23, the screws 26 are covered by the lamp body and therefore are completely inaccessible, when the lamp is fitted onto the bracket. Since the lamp body is locked positively onto the bracket, if the key switch 12, 20 is removed it as impossible to unfasten the bracket. The underside of the lower lamp body shell 3 has a recess 37 (FIG. 6) shaped to accommodate the disc 23 and arm 22, to make it difficult for a prospective thief to insert a tool to lever apart the lamp body and bracket. The recess may be symmetrical so the lamp can be reversed relative to the bracket.

In the illustrated embodiment, the blade 15 has lateral ribs 54 for increased strength, and has a slight taper at its ends and sides, the socket 16 being correspondingly tapered internally. These tapers assist demoulding of the components, and also make it easier for the user to locate the blade into the socket 16.

Blade 15 and its arm 22 are integral with the disc 23, alternatively the disc 23 may be a separate component to which the blade 15 and arm 22 are attached in any convenient way.

To facilitate moulding of the integral arm, blade, and disc from plastics material, the disc 23 may have an aperture under the notch 21 so that a simple mould core or pin can form the undercut notch.

In the illustrated embodiment the upper clamp saddle 25 consists of a circular disc 55 with an upstanding rim 56 spaced radially from the ring of serrations 24, the latter standing above the level of the rim 56. Bosses 57 for the screws 26 extend between the rim 56 and the raised serrations 24. The underside of the saddle 25, and the upper side of the lower saddle 27, are provided with integral ribs 89 for enhanced stiffness.

The locking blade and clamping saddles can be made of any suitable material for example light metal alloy, plastics material, plastics coated metal and so on. Preferred materials include polycarbonate for blade 15 and swivel 23, and ABS or "Bayblend" (Trade Mark) for the saddles. Preferably, the clamping surfaces are provided with linings 30 in order to improve the grip on the cycle frame and reduce the risk of damage to the cycle paintwork. The saddles and linings may be coloured so as to match the colour scheme of the lamp body, for example the saddles being matt black and the linings being yellow.

The bracket can be clamped onto the frame member 10 in any orientation around the latter, and thereafter the blade 15 can be set to any angular orientation relative to the bracket. Consequently, the lamp can be set in almost any orientation relative to the cycle frame member 29 on which the bracket is fitted, and as a result the user has an exceptionally wide choice of positions for mounting the lamp on a cycle, because the lamp can be set in a suitable orientation, practically regardless of the orientation of the frame member in question. Thus, for example, the lamp can be mounted on the front or rear fork, handlebar stem, handlebar, saddle stem or main frame members. For mounting on frame members of small cross section, a cylindrical adapter 43 may be provided to fit between the clamping saddles and define a clamping opening of reduced diameter.

The linings 30 preferably comprise a pair of semi-circular mouldings of suitable elastomer or soft plastics material, for example "Thermoflo" grade 091 thermoplastic rubber manufactured by Evode. The internal surfaces of the linings are dimpled, for improved grip on the cycle frame. The two semi-circular linings are integral with one another, through an integral hinge 58 to faciitate manufacture and reduce the risk of loss of the linings; the resilience of the hinge 58 will tend to hold the linings pressed into the respective clamp seats 42.

It should be noted that the clamp seats 42 are of a dished or recessed configuration, each being of smaller radius at its rim than at a position midway between its two opposite rims, and the linings 30 have external surfaces which are correspondingly convex in axial cross section, so that the linings are positively and accurately located in the clamp seats.

Figure 4:
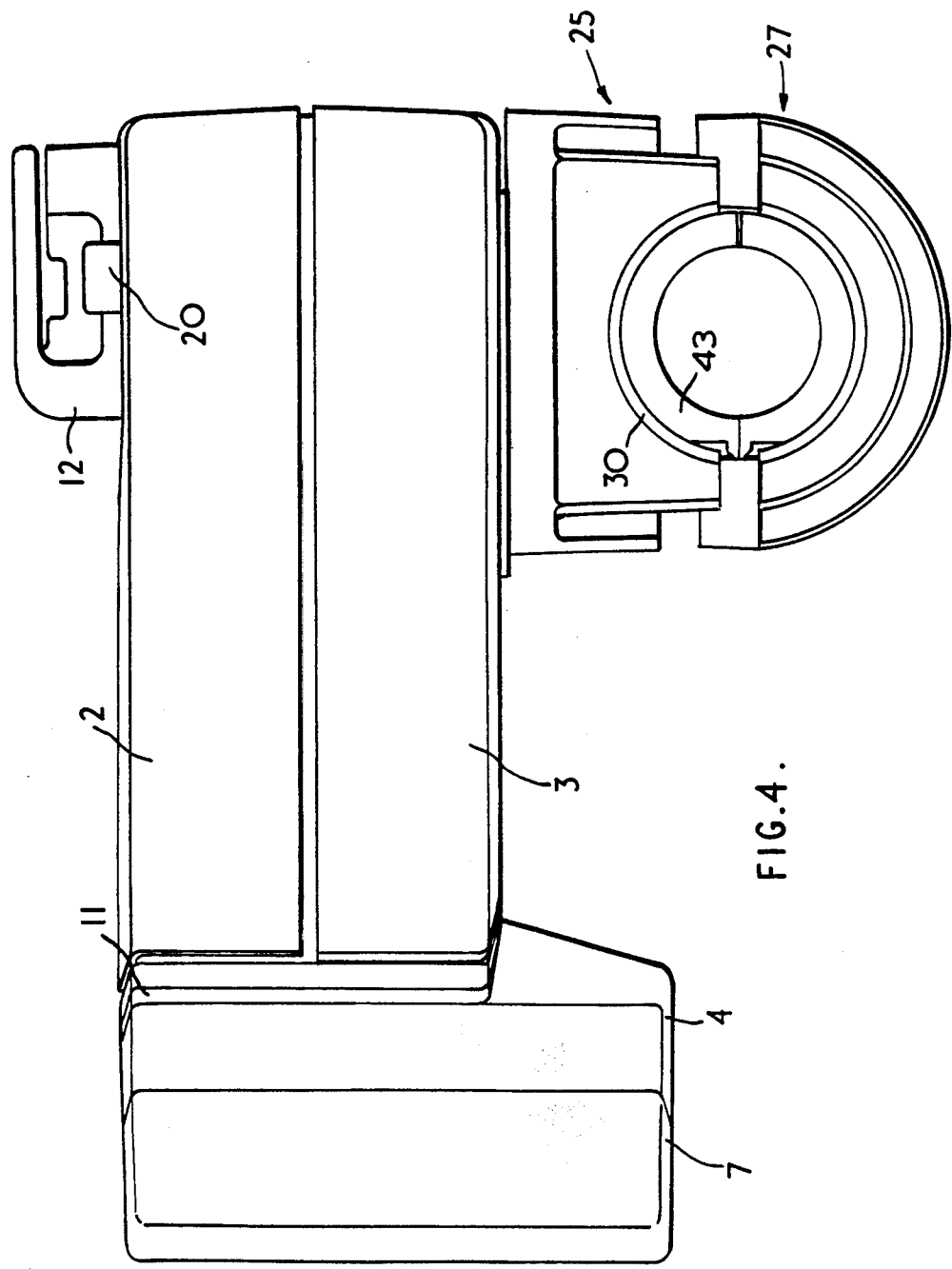
FIG. 4 is a side view of the lamp and bracket.
Figure 5:
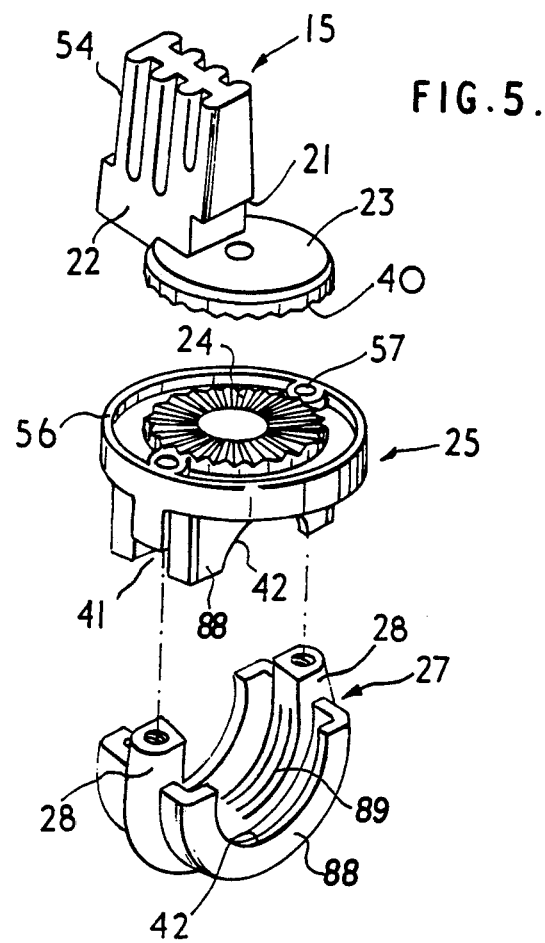
FIG. 5 is an exploded view of the bracket.
Figure 8:
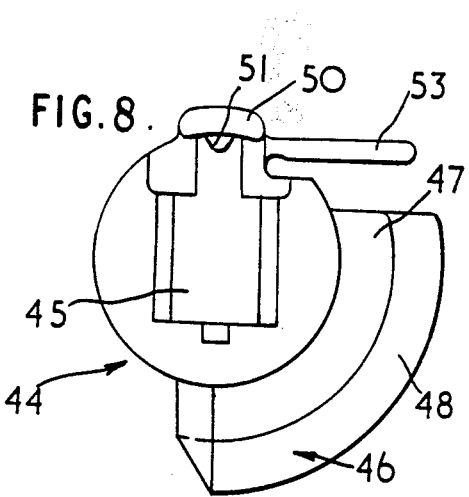
FIG. 8 is an enlarged plan view of a cam plate of the switch and locking mechanism.
Figure 6:
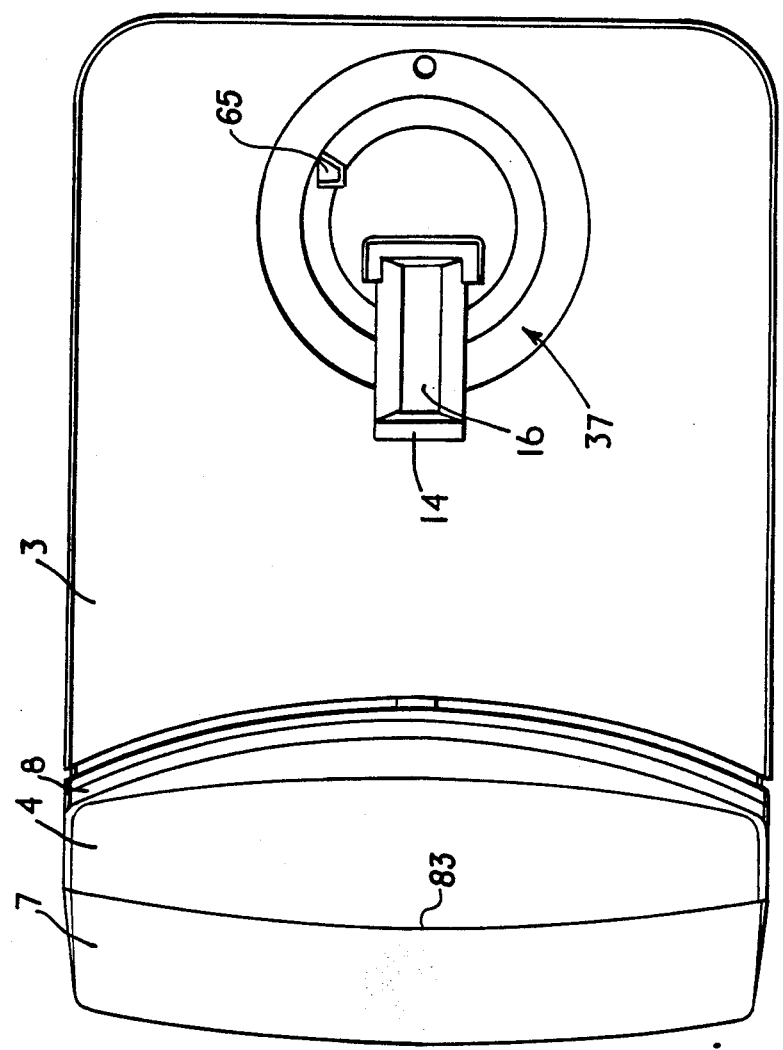
FIG. 6 shows the underside of the lamp.

FIGS. 2 and 4 also show clamp adaptors 43 enabling the bracket to be clamped onto frame members of smaller diameter. Preferably, the adaptors 43 are generally similar to the linings 30 and are made of the same or similar material. As shown, the adaptors 43 are generally semi-circular elastomer components, united at one side by an integral hinge 59. To locate the adaptors 43 in the linings 30, the latter have central holes 60 to receive external radial pegs 61 moulded integrally on the adaptors 43.

Figure 10:
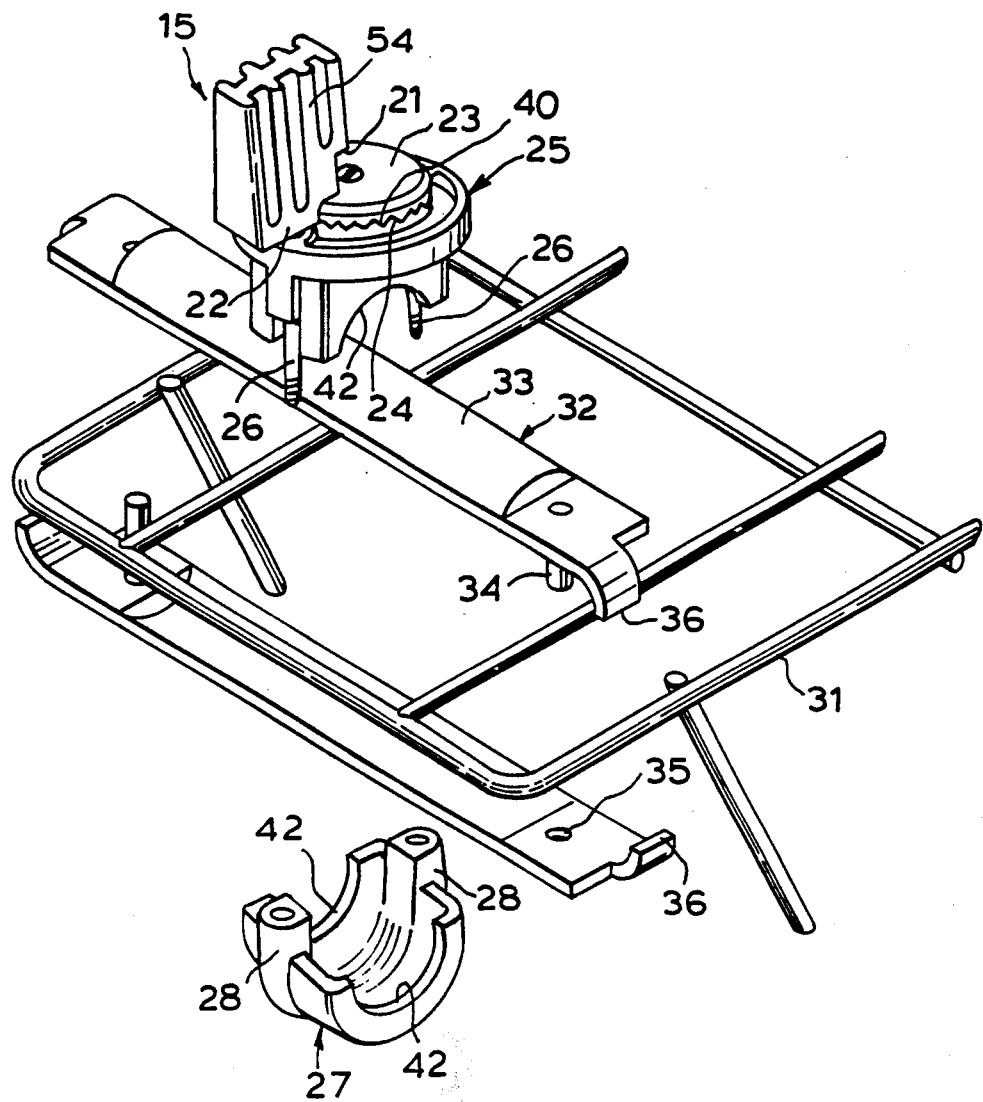
FIG. 10 shows an adapter for mounting the bracket on a load carrier.

For mounting on a luggage carrier grid or pannier support, an adaptor may be provided for example as shown in FIG. 10 which shows a carrier frame 31 of wire. The wires are too thin for the bracket to be attached directly or with the use of the above-mentioned adaptor sleeve. Instead, there is provided a pair of identical adaptor bars 32 between which a portion of the carrier frame is clamped. Each adaptor bar has a central region 33 with an external profile to match the internal surfaces of the clamping saddles, a locating pin 34 near one end to enter a locating hole 35 in the other end of the other adaptor bar, and half-width angular locating tongues 36 which provide lateral location against each other. The adaptor bars are placed on opposite sides of the carrier frame, with the pins 34 entering the hole 35 and the respective tongues in engagement around appropriate wires of the carrier frame to provide endwise location, then the saddles of the bracket are fitted around the central regions 33 of the adaptor bars and are fastened together by means of the clamping screws 26 thereby clamping the adaptor bars onto the carrier frame. The user can select the angular orientation of the bracket around the adaptor bars (to the extent permitted by any adjacent wires of the carrier frame) and can also select the orientation of the blade 15 on the bracket.

The blade of the bracket may be replaced by a holding projection of different shape, for example in the nature of a post, or a blade oriented at right angles to the illustrated blade but still parallel to the axis of rotation of the blade on the upper clamping saddle.

It will be seen that by this invention we have provided a cycle lamp and mounting means therefor, of exceptional versatility and security.

Although in this specification we have described a lamp body of a particular design, it is to be understood that the design of the lamp body, for example the arrangement of its reflector and lens portion, can be varied without departing from the scope of the invention.

The invention has been described with particular reference to the mounting of a bicycle front or rear lamp. However, a similar bracket can be used for mounting other accessories on a bicycle, tricycle or motor cycle, using analogous locking mechanisms provided in such accessories. By way of example only, analogous mounting and locking constructions can be provided for horns, direction indicators, reflectors, badges and other ornaments, the projecting arms or flags used to make a bicycle more visible, luggage carriers, bells and so on.

The lock need not be a cylinder lock but can be another form of key-operated lock, or a code combination lock.

What is claimed is:

1. In combination, an electrical accessory for a cycle, and a bracket for mounting the said accessory on a cycle, in which:

said accessory comprising a housing, an electrical switch in said housing for operating said accessory, a receptacle incorporated in and open to the exterior of the housing, a lock incorporated in said housing which lock is lockable and releasable by a removable key, said lock being operatively coupled to said switch, and a locking member in said housing adjacent said receptacle and operatively coupled to said lock for movement by said key relative to said receptacle;

said bracket comprises a body portion, clamping means such that said body portion can be clamped onto a cycle, and a projection extending from said body portion which projection has a configuration complementary to said receptacle and locking member and is receivable in said receptacle such that said accessory is mounted removably on said bracket;

and said locking member is movable by said key to a first position in which said locking member is clear of said receptical and thereby permits said projection to be inserted in and removed from said receptacle, and a second position such that said locking member positively engages and retains said projection when inserted in said receptacle whereby said accessory and bracket are rendered inseparable, said operating member being removable from said accessory at least when said locking member is in said second position.

2. The combination according to claim 1 in which the lock is a cylinder lock.

3. The combination claimed in claim 1 or 2 in which the accessory has an openable portion and in which the lock in said second position holds the openable portion closed.

4. The combination claimed in any of claims 1 to 2 in which the said bracket clamping means comprise releasable elements, and the said releasable elements are disposed so as to be rendered inaccessible by said accessory when the said accessory is mounted on the bracket.

5. The combination claimed in any of clams 1 to 2 in which the bracket comprises a pair of opposed clamping elements defining between them an aperture having a first axis, for clamping the bracket in position about an elongate member of a cycle, and a swivel member mounted adjustably on one of the said clamping elements for swivelling about a second axis transverse to said first axis and provided with the said projection projecting parallel to and eccentric from said second axis, whereby said swivelling enables the position of the accessory to be adjusted relative to the said bracket.

6. An electrical accessory for a cycle, which includes a lock, a removable key insertable in the lock, a control switch operatively coupled to said key when inserted in said lock, such that said switch is operable by said key when inserted and is inoperable when said key is removed, and mounting means having a first condition such that said accessory is secured by said mounting means to a cycle and a second condition such that said mounting means is not effective to secure said accessory to a cycle, said mounting means being operatively coupled to said key when inserted in said lock such that said mounting means is operable between its said first and second conditions by said key when inserted, said key being removable from said lock in said first condition of said locking means.

7. The accessory according to claim 6 in which, when the mounting means is in said second condition, the switch is in an off condition.

8. The accessory according to claim 6 or 7 in which the said accessory has separable components, and in which the said lock is operative to lock the separable components together, when in the locked condition of the lock.

9. A mounting bracket for mounting a cycle accessory on an elongate member of a cycle, comprising a pair of opposed clamping saddles, disposable about a said member and defining between them a clamping aperture having an axis extending through said aperture, for receiving said member, clamping means for urging said saddles towards one another perpendicular to said axis for clamping between them a said member disposed in said aperture, a swivel member mounted on one said clamping member and rotatable thereon about a swivel axis substantially perpendicular to the aforesaid axis of said aperture, means for releasably securing said swivel member in a selected angular position about said swivel axis, and a mounting projection on said swivel member projecting therefrom generally parallel to and positioned eccentric from said swivel axis, such that said projection can mount said accessory on said bracket with the position of said accessory adjustable by selection of said angular position of said swivel member.

10. The bracket of claim 9 in which the said projection is a flat or substantially flat blade mounted on the said swivel member in such a manner that the blade can swivel about an axis substantially parallel to but eccentric relative to the blade.

11. In combination, a cycle lamp and a mounting bracket for mounting the lamp on a cycle, and in which: the said lamp comprises a body having a removable portion for access to the body interior, the body having an aperture therein, switching means in the body, and an operating mechanism mounted in the removable body portion which mechanism comprises a cylinder lock, a key for the said lock, and operating means operable by rotation of the key in the lock, which operating means comprise a switch-operating element, and a locking element adjacent to the said aperture; and in which the said bracket comprises opposed first and second clamping saddles, clamping means for urging said saddles towards one another clamp the saddles about a cycle frame member disposed between them, a swivel member mounted on a first one of the said saddles and disposable thereon selectively in different angular positions about a swivel axis, and a projection on said swivel member extending parallel to the swivel axis and eccentric relative thereto, the said projection having a configuration complementary to the said aperture in the lamp body and being insertable therein, and further having a configuration adapted to make positive retaining engagement with the said locking element when the said projection is inserted in the lamp body and the key is operated to lock the operating mechanism.

12. The combination claimed in claim 11 in which, in the unlocked condition of said lock, the lamp is switched off.

13. The combination claimed in claim 11 or 12 in which, in the locked condition of the lock, the lamp can be selectively switched on and off by rotation of said key.

* * * * *